United States Patent
Suzuki

(10) Patent No.: US 9,688,409 B2
(45) Date of Patent: Jun. 27, 2017

(54) STORAGE UNIT FOR AIRCRAFT PASSENGER SEAT

(71) Applicant: JAMCO Corporation, Mitaka-shi, Tokyo (JP)

(72) Inventor: Michihito Suzuki, Mitaka (JP)

(73) Assignee: JAMCO CORPORATION, Tokyo (JP)

( * ) Notice: Subject to any disclaimer, the term of this patent is extended or adjusted under 35 U.S.C. 154(b) by 0 days.

(21) Appl. No.: 15/112,012

(22) PCT Filed: Sep. 3, 2014

(86) PCT No.: PCT/JP2014/073191
§ 371 (c)(1),
(2) Date: Jul. 15, 2016

(87) PCT Pub. No.: WO2015/107721
PCT Pub. Date: Jul. 23, 2015

(65) Prior Publication Data
US 2016/0332731 A1     Nov. 17, 2016

(30) Foreign Application Priority Data

Jan. 17, 2014   (JP) .................................. 2014-006521

(51) Int. Cl.
*B64D 3/00*     (2006.01)
*B64D 11/06*    (2006.01)
*E05D 3/14*     (2006.01)

(52) U.S. Cl.
CPC ............ *B64D 11/0636* (2014.12); *E05D 3/14* (2013.01); *E05Y 2201/21* (2013.01);
(Continued)

(58) Field of Classification Search
CPC ............ B64D 11/0602; B64D 11/0627; B64D 11/0629; B64D 11/0636; B64D 11/0638; B60R 2011/0014; B60N 2/4686
See application file for complete search history.

(56) References Cited

U.S. PATENT DOCUMENTS 6,059,364 A * 5/2000 Dryburgh ............. A47C 1/0352
                                                   105/322
2007/0236036 A1* 10/2007 Downey ............. B60N 2/4686
                                                    296/37.1
(Continued)

FOREIGN PATENT DOCUMENTS

EP         1 403 132 A2     3/2004
JP       2006-282132 A     10/2006
(Continued)

OTHER PUBLICATIONS

"Snap-Fit Joints for Plastics." Bayer MaterialScience. Archived by internet archive on Nov. 19, 2012. Retrieval URL: http://web.archive.org/web/20121119232733/http://fab.cba.mit.edu/classes/S62.12/people/vernelle.noel/Plastic_Snap_fit_design.pdf.*

(Continued)

*Primary Examiner* — Philip J Bonzell
*Assistant Examiner* — Michael Kreiner
(74) *Attorney, Agent, or Firm* — Westerman, Hattori, Daniels & Adrian, LLP

(57) ABSTRACT

A storage unit (100) has a storage box (110) and a base frame (130) which is removably mounted to the storage box. A hinge (160) is provided to a hinge mounting section (140) of the base frame (130) and supports a lid (150) so that the lid can be opened and closed. The hinge (160) is composed of two inner arms (170) and outer arms (180). A rotation shaft of the hinge is guarded by the inner arms (170) and outer arms (180), so that objects and fingers are prevented from being caught.

4 Claims, 6 Drawing Sheets

(52) U.S. Cl.
CPC ... *E05Y 2201/266* (2013.01); *E05Y 2201/712* (2013.01); *E05Y 2900/502* (2013.01); *E05Y 2900/538* (2013.01)

(56) References Cited

U.S. PATENT DOCUMENTS

| | | |
|---|---|---|
| 2009/0200825 A1 | 8/2009 | Shimajiri |
| 2015/0212323 A1 | 7/2015 | Kobayashi et al. |

FOREIGN PATENT DOCUMENTS

| | | |
|---|---|---|
| JP | 2007-245838 A | 9/2007 |
| JP | 2008-113806 A | 5/2008 |
| JP | 2009-154568 A | 7/2009 |
| JP | 2012-210844 A | 11/2012 |
| JP | 2013-203376 A | 10/2013 |
| WO | 2012/001790 A1 | 1/2012 |
| WO | 2013/146161 A1 | 10/2013 |

OTHER PUBLICATIONS

International Search Report dated Dec. 2, 2014, issued in counterpart International Application No. PCT/JP2014/073191, w/English translation (4 pages).

Written Opinion dated Dec. 2, 2014, issued in counterpart International Application No. PCT/JP2014/073191, w/English translation (7 pages).

Notification of Reasons for Refusal dated Sep. 15, 2015, issued in counterpart Japanese Patent Application No. 2014-006521, w/English translation (4 pages).

Decision to Grant a Patent dated Mar. 15, 2016, issued in counterpart Japanese Patent Application No. 2014-006521, w/English translation (6 pages).

Extended (supplementary) European Search Report dated Jan. 31, 2017, issued in counterpart European Application No. 14878775.7. (7 pages).

\* cited by examiner

STORAGE UNIT FOR AIRCRAFT PASSENGER SEAT

TECHNICAL FIELD

The present invention relates to a unit for storing small articles, such as an amenity set and a headset, arranged in a periphery of a business-class passenger seat of an aircraft.

BACKGROUND ART

FIG. 1 is a perspective view of a business-class or first-class seat arranged in a cabin of an aircraft.

A seat 1 is configured so that a seat body 10 is surrounded by a shell 20 equipped with an ottoman 30 and the like. Further, an electrical jack 40 for connecting electrical components and a reading light 42 are provided on an inner side of the shell 20.

A unit 50 storing an audio headset and the like is also provided.

FIG. 7 is a cross-sectional view of a main portion of a conventional storage unit.

According to the conventional storage unit denoted as a whole by reference number 50, a lid 70 that opens and closes is attached to a storage box 60 via a hinge 80.

CITATION LIST

Patent Literature

[PTL 1] Japanese Unexamined Patent Application Publication No. 2008-113806
[PTL 2] Japanese Unexamined Patent Application Publication No. 2012-210844
[PTL 3] Japanese Unexamined Patent Application Publication No. 2006-282132

SUMMARY OF INVENTION

Technical Problem

Normally, a body of the aircraft is inclined upward by three degrees during level flight. The lid 70 of a conventional storage unit maintains an upright position when it is in an opened state, but if the lid falls in the closing direction by the inclination or the vibration of the aircraft body, a finger of a passenger or other objects may be caught.

A braking function using friction may be provided to the hinge 80, but it was difficult to completely prevent an object from being caught, and in case the hinge was broken, the whole unit had to be replaced.

The object of the present invention is to provide a storage unit solving the problems mentioned above.

Solution to Problem

In order to achieve the above objects, the present invention provides a storage unit arranged in a periphery of a passenger seat of an aircraft, including a storage box, a base frame removably mounted to the storage box, a hinge mounting section provided at an end portion of the base frame, and a hinge having a four-joint link structure including two inner arms and two outer arms, having one end portion mounted to the hinge mounting section and another end portion attached to a lid.

Further, the storage box includes a mounting section having elasticity and a lateral slit formed on the mounting section, and the base frame includes an engagement claw that fits to the slit and a locking portion to which an end portion of the storage box contacts.

Moreover, the hinge includes a friction damper, and the friction damper includes a sector gear provided on the inner arm and a pinion gear meshed with the section gear, and a means providing friction braking force to a rotation shaft of the pinion gear.

Furthermore, components are formed of synthetic resin.

Advantageous Effects of Invention

The storage unit arranged on a passenger seat of an aircraft according to the present invention is configured as above, so that fingers or objects can be prevented from being caught when the lid is opened and closed. Further, a space below the hinge can be utilized effectively. Maintenance operation is facilitated, and costs required for replacing components can be cut down.

DESCRIPTION OF EMBODIMENTS

Figure 1:
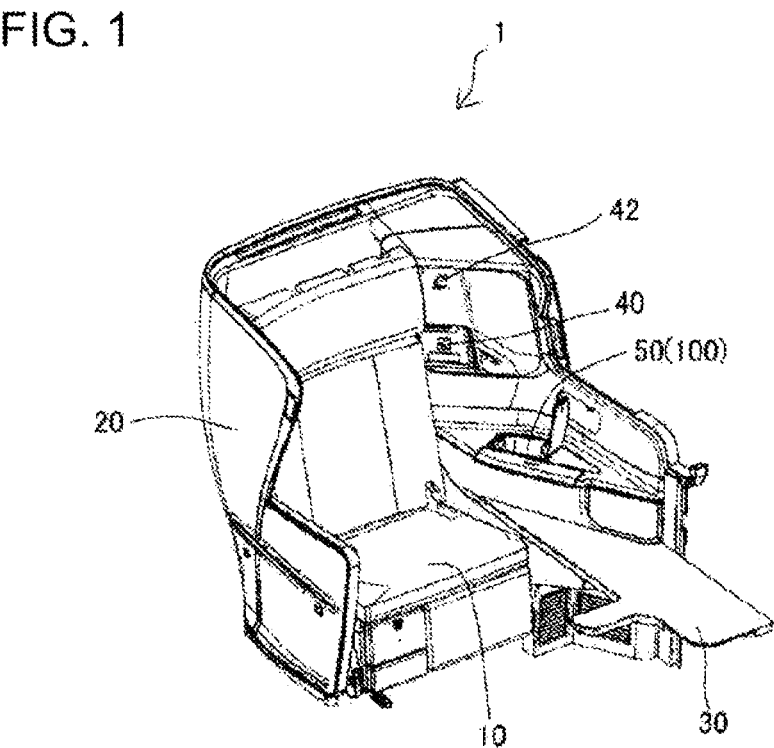
FIG. 1 is a perspective view of an aircraft passenger seat implementing the present invention.
Figure 2:
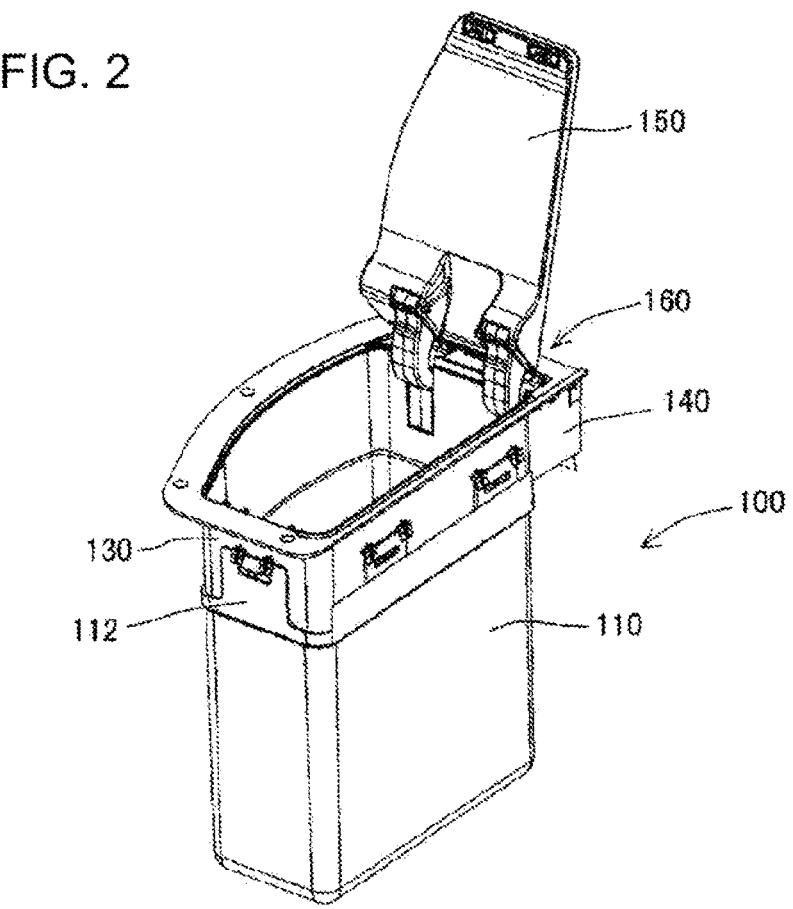
FIG. 2 is a perspective view of a whole body of a storage unit according to the present invention.
Figure 3:
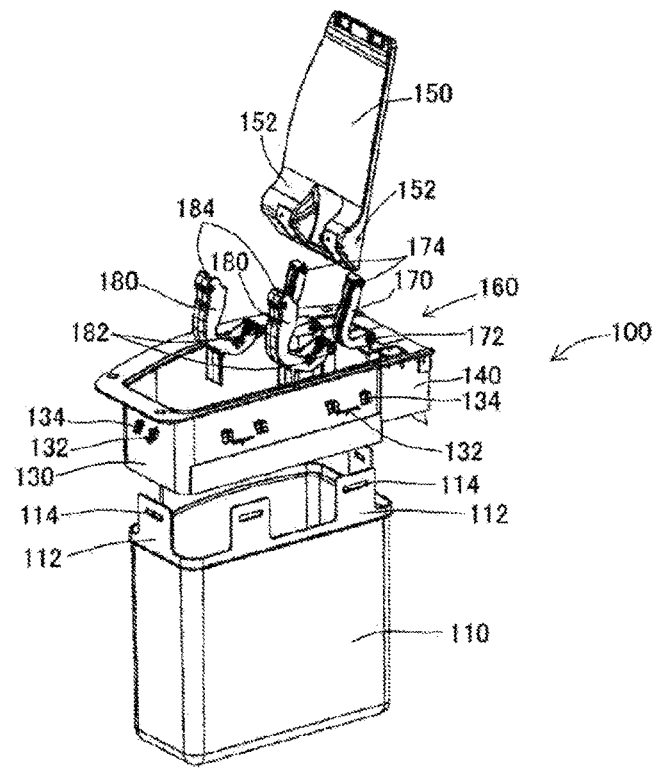
FIG. 3 is a perspective view of a configuration of components of the storage unit according to the present invention.

FIG. 2 is a perspective view of a whole body of a storage unit according to the present invention, and FIG. 3 is a component configuration diagram.

A storage unit 100 has all major components formed of plastic, wherein a storage box 110 has a mounting section 112 disposed at an upper portion thereof. The mounting section 112 is a thin-wall plastic having elasticity, and a lateral slit 114 is formed thereto.

A base frame 130 formed as a separate member as the storage box 110 includes an engagement claw 132 and a locking portion 134, and the engagement claw 132 fits to the slit 114.

A hinge mounting section 140 is disposed at one end portion of the storage box 110, and a hinge 160 is mounted to the hinge mounting section 140. The hinge 160 has two inner arms 170 and two outer arms 180, constituting a four-joint link. Base frame-side inner arm mounting sections 172 of the inner arms 170 are attached revolvably to the base frame 130 within the hinge mounting section. Base frame-side outer arm mounting sections 182 of the outer arms 180 are also attached revolvably to the base frame 130 within the hinge mounting section.

A lid 150 has hinge arm mounting sections 152, and lid-side inner arm mounting sections 174 of two inner arms 170 and lid-side outer arm mounting sections 184 of two outer arms 180 are respectively attached removably to the mounting sections 152.

The hinge 160 enables the lid 150 to cover the opening of the base frame 130 in an openable-closable manner.

Figure 4:
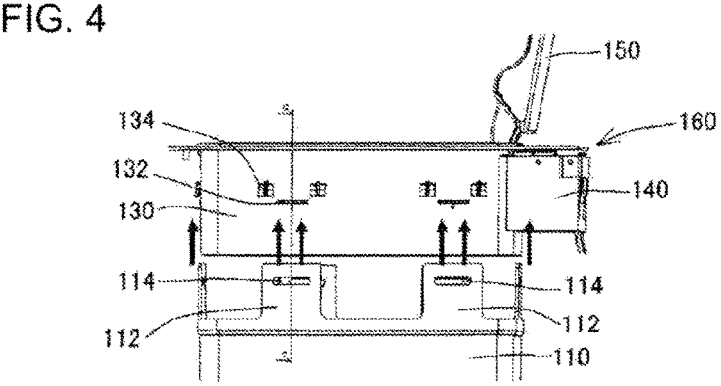
FIG. 4 is an explanatory view of a main portion of the storage unit according to the present invention.

FIG. 4 illustrates a state where the base frame 130 is pulled out of the storage box 110 for maintenance of the hinge 160 or replacement of the lid 150.

The mounting section 112 has elasticity, so that when the base frame 130 is pulled up, the engagement claws 132 can be removed from the slits 114 of the mounting section 112.

Figure 5:
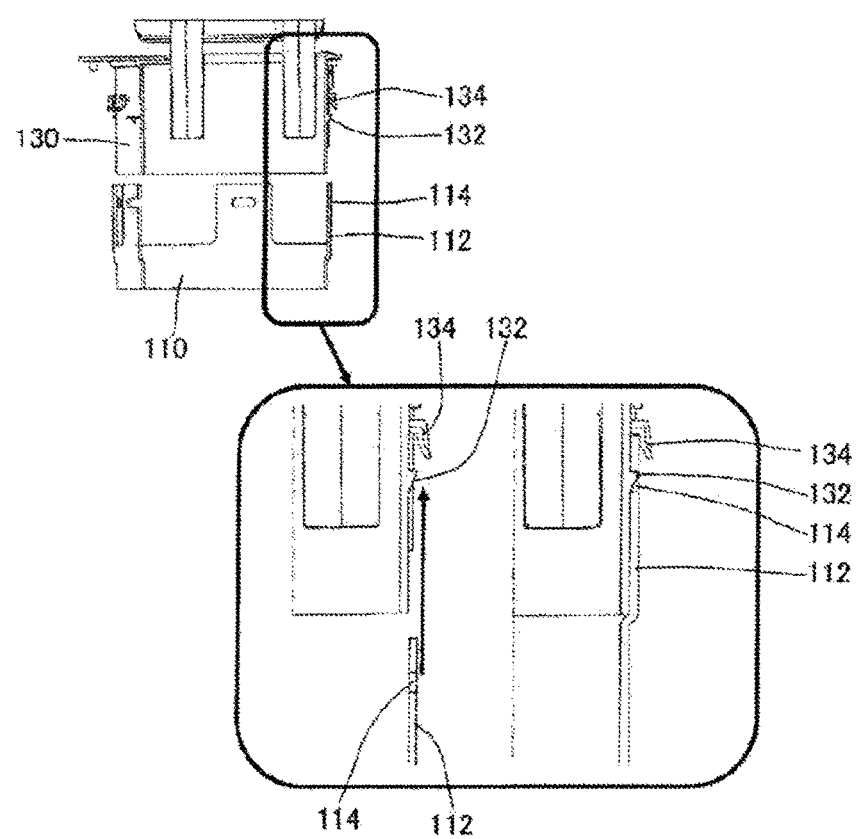
FIG. 5 is an explanatory view of a main portion of the storage unit according to the present invention.

FIG. 5 illustrates a state where the base frame 130 having the lid 150 attached is inserted to a storage box. The mounting section 112 has elasticity, so that the engagement claws 132 can be slid into the slits 114 of the mounting section 112 and engaged thereto.

Figure 6:
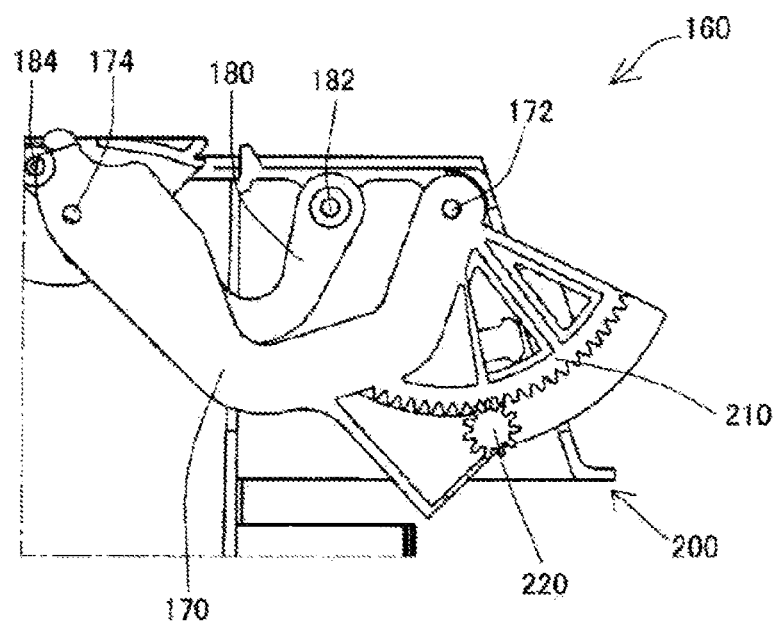
FIG. 6 is an explanatory view of a main portion of the storage unit according to the present invention.
Figure 7:
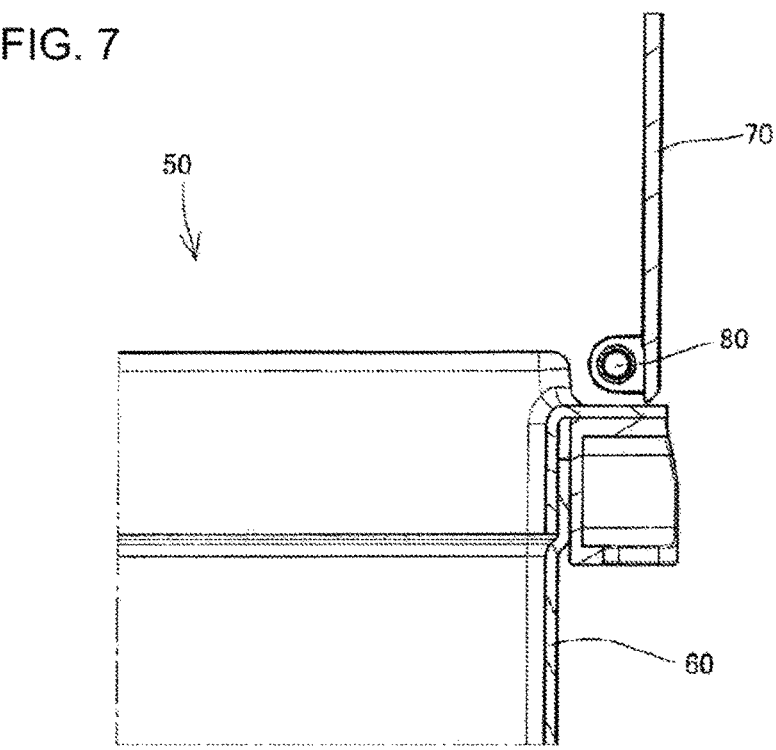
FIG. 7 is an explanatory view of a main portion of a storage unit according to a prior art.

FIG. 6 is an explanatory view of a friction damper mechanism attached to the hinge 160.

A friction damper 200 has a sector gear 210 formed integrally with the inner arm 170 formed of plastic. The sector gear 210 is meshed with a pinion 220 having a friction function.

In synchronization with the opening and closing of the lid 150, the sector gear 210 revolves together with the inner arm 170 around a shaft center of the base frame-side mounting section 172 of the inner arm.

The revolution of the sector gear 210 causes the pinion 220 with a friction function to rotate at high speed.

The pinion 220 with a friction function is equipped with a friction braking mechanism not shown. A structure of applying a light braking force to a rotation shaft of the pinion 220 with a friction function is adopted as the friction braking mechanism, for example.

According to the present friction damper 200, the friction damper 200 is formed as a separate member as the rotation shaft of the hinge, instead of having a friction damper mechanism assembled into the hinge of the inner arms 170 or the outer arms 180, so that damaging and the like can be prevented and a secure damping function can be ensured.

As described, according to the present storage unit 100, the revolving section of the hinge is guarded by the arms, so that objects and fingers can be prevented from being caught.

REFERENCE SIGNS LIST

100 Storage unit
110 Storage box
112 Mounting section
114 Slit
130 Base frame
132 Engagement claw
134 Locking portion
140 Hinge mounting section
150 Lid
152 Hinge arm mounting section
160 Hinge
170 Inner arm
172 Base frame-side inner arm mounting section
174 Lid-side inner arm mounting section
180 Outer arm
182 Base frame-side outer arm mounting section
184 Lid-side outer arm mounting section
200 Friction damper
210 Sector gear
220 Pinion with friction function

The invention claimed is:

1. A storage unit arranged in a periphery of a passenger seat of an aircraft, comprising:
    a storage box;
    a base frame formed as a separate member from the storage box and removably mounted to an upper surface of the storage box;
    a hinge mounting section provided at an end portion of the base frame; and
    a hinge comprising a four-joint link structure comprising two inner arms and two outer arms, having one end portion mounted to the hinge mounting section and another end portion attached to a lid of the storage unit.

2. The storage unit of a passenger seat of an aircraft according to claim 1, wherein
    the storage box comprises a mounting section having elasticity and a lateral slit formed on the mounting section, and the base frame comprises an engagement claw that fits to the slit and a locking portion to which an end portion of the storage box contacts.

3. The storage unit of a passenger seat of an aircraft according to claim 1, wherein
    the hinge comprises a friction damper, and the friction damper comprises a sector gear provided on the inner arm and a pinion gear meshed with the section gear, the friction damper further comprising a means providing friction braking force to a rotation shaft of the pinion gear.

4. The storage unit of a passenger seat of an aircraft according to claim 1, wherein the storage box, the base frame, the hinge mounting section and the hinge are all formed of synthetic resin.

* * * * *